(12) United States Patent
Watkins et al.

(10) Patent No.: US 7,548,815 B2
(45) Date of Patent: Jun. 16, 2009

(54) METHOD AND SYSTEM FOR PROGRAMMABLE MOBILE VEHICLE HOTSPOTS

(75) Inventors: Gary A. Watkins, Royal Oak, MI (US); Thomas P. Grau, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 761 days.

(21) Appl. No.: 10/852,544

(22) Filed: May 24, 2004

(65) Prior Publication Data

US 2005/0273255 A1 Dec. 8, 2005

(51) Int. Cl.
G01C 21/00 (2006.01)

(52) U.S. Cl. ............... 701/213; 342/450; 342/451; 455/456.1; 455/456.3; 455/456.6

(58) Field of Classification Search ............ 701/210, 701/213; 340/995.13, 989, 995.25; 380/255, 380/270; 342/450; 370/350, 328, 338; 455/456.1
See application file for complete search history.

(56) References Cited

U.S. PATENT DOCUMENTS

| | | | | |
|---|---|---|---|---|
| 5,983,161 | A * | 11/1999 | Lemelson et al. | 701/301 |
| 6,275,773 | B1 * | 8/2001 | Lemelson et al. | 701/301 |
| 6,281,970 | B1 * | 8/2001 | Williams et al. | 356/141.4 |
| 6,487,500 | B2 * | 11/2002 | Lemelson et al. | 701/301 |
| 7,313,276 | B2 * | 12/2007 | Simelius et al. | 382/181 |
| 7,382,771 | B2 * | 6/2008 | Leblanc et al. | 370/352 |
| 2002/0022927 | A1 * | 2/2002 | Lemelson et al. | 701/301 |
| 2002/0176579 | A1 * | 11/2002 | Deshpande et al. | 380/270 |
| 2003/0177058 | A1 * | 9/2003 | Needham | 705/10 |
| 2004/0137901 | A1 * | 7/2004 | Hamasaki et al. | 455/436 |
| 2004/0179512 | A1 * | 9/2004 | Leblanc et al. | 370/352 |
| 2004/0199303 | A1 * | 10/2004 | Ohmura et al. | 701/5 |

(Continued)

FOREIGN PATENT DOCUMENTS

EP 1859508 A1 * 11/2007

(Continued)

OTHER PUBLICATIONS

Towards automated authentication for mobile users in WLAN hotspots, Ott, J.; Kutscher, D.; Koch, M.; Vehicular Technology Conference, 2005. VTC-2005-Fall. 2005 IEEE 62$^{nd}$, vol. 2, Sep. 25-28, 2005 pp. 1232-1241, Digital Object Identifier 10.1109/VETECF.2005. 1558124.*

(Continued)

*Primary Examiner*—Cuong H Nguyen

(57) ABSTRACT

The present invention provides a method of operating a telematics device within a mobile vehicle communication system. The method includes generating at least one personal route profile, comparing predetermined GPS hotspots to the personal route profiles, detecting real-time traffic updates associated with the predetermined GPS hotspots, identifying GPS hotspots corresponding to the personal route profile and based on the real-time traffic updates, and providing information relating to selected identified GPS hotspots based on the real-time traffic updates. The personal route profile may be generated from a user interface. The predetermined GPS hotspots may be created based on user interface input. The selected GPS hotspots may include all identified GPS hotspots within a predetermined geographic area of the personal route profile. The selected GPS hotspots may include GPS hotspots in the forward path of a vehicle including the telematics device.

20 Claims, 4 Drawing Sheets

U.S. PATENT DOCUMENTS

| | | | |
|---|---|---|---|
| 2004/0268381 A1 * | 12/2004 | Simelius et al. | 725/19 |
| 2005/0273255 A1 * | 12/2005 | Watkins et al. | 701/210 |
| 2007/0167173 A1 * | 7/2007 | Halcrow et al. | 455/456.2 |
| 2007/0208864 A1 * | 9/2007 | Flynn et al. | 709/227 |
| 2008/0062049 A1 * | 3/2008 | Soler Castany et al. | 343/702 |

FOREIGN PATENT DOCUMENTS

| | | | |
|---|---|---|---|
| EP | 1982467 A1 * | 10/2008 | |
| WO | WO 2006034940 A1 * | 4/2006 | |
| WO | WO 2006097496 A1 * | 9/2006 | |
| WO | WO 2007082912 A1 * | 7/2007 | |

OTHER PUBLICATIONS

Intelligent distribution and logistics, A. Harrison; A. White; Intelligent Transport Systems, IEE Proceedings, vol. 153, Issue 2, Jun. 2006 pp. 167-180.*

Benefit and Pricing of Spatio-Temporal Information in Mobile Peer-to-Peer Networks, Bo Xu; Wolfson, O.; Rishe, N.; System Sciences, 2006. HICSS '06. Proceedings of the 39th Annual Hawaii International Conference on, vol. 9, Jan. 4-7, 2006 pp. 223b-223b, Digital Object Identifier 10.1109/HICSS.2006.74.*

A concept of communication distance and its application to six situations in mobile environments, Nickerson, J. V.; Mobile Computing, IEEE Transactions on, vol. 4, Issue 5, Sep.-Oct. 2005 pp. 409-419, Digital Object Identifier 10.1109/TMC.2005.60.*

Mobile Enabled Large Scale Wireless Sensor Networks, Canfeng Chen; Jian Ma; Advanced Communication Technology, 2006. ICACT 2006. The 8th International Conference, vol. 1, Feb. 20-22, 2006 pp. 333-338.*

Connectivity Maps: Measurements and Applications, Kamakaris, T.; Nickerson, J.V.; System Sciences, 2005. HICSS '05. Proceedings of the 38th Annual Hawaii International Conference on, Jan. 3-6, 2005 pp. 307-307, Digital Object Identifier 10.1109/HICSS.2005.162.*

Broadband satellite networks-the global IT bridge, Jamalipour, A.; Proceedings of the IEEE, vol. 89, Issue 1, Jan. 2001 pp. 88-104, Digital Object Identifier 10.1109/5.904508.*

Autonomic system for mobility support in 4G networks, Vidales, P.; Baliosian, J.; Serrat, J.; Mapp, G.; Stajano, F.; Hopper, A.; Selected Areas in Communications, IEEE Journal on, vol. 23, Issue 12, Dec. 2005 pp. 2288-2304, Digital Object Identifier 10.1109/JSAC.2005.8567198.*

Routing techniques in wireless sensor networks: a survey, Al-Karaki, J.N.; Kamal, A.E.; Wireless Communications, IEEE [see also IEEE Personal Communications], vol. 11, Issue 6, Dec. 2004 pp. 6-28, Digital Object Identifier 10.1109/MWC.2004.1368893.*

Exploiting user profiles to support differentiated services in next-generation wireless networks, Pandey, V.; Ghosal, D.; Mukherjee, B.; Network, IEEE, vol. 18, Issue 5, Sep.-Oct. 2004 pp. 40-48, Digital Object Identifier 10.1109/MNET.2004.1337734.*

Urban Flash Flood Monitoring, Mapping and Forecasting via a Tailored Sensor Network System, Ni-Bin Chang; Da-Hai Guo; Networking, Sensing and Control, 2006. ICNSC '06. Proceedings of the 2006 IEEE International Conference on Apr. 23-25, 2006 pp. 757-761.*

DIFS: a distributed index for features in sensor newtworks, Greenstein, B.; Estrin, D.; Govindan, R.; Ratnasamy, S.; Shenker, S.; Sensor Network Protocols and Applications, 2003. Proceedings of the First IEEE. 2003 IEEE International Workshop on, May 11, 2003 pp. 163-173, Digital Object Identifier 10.1109/SNPA.2003.1203367.*

Service Maps for Heterogeneous Network Environments, Kutscher, D.; Ott, J.; Mobile Data Managament, 2006. MDM 2006. 7th International Conference on, May 10-12, 2006 pp. 27-27, Digital Object Identifier 10.1109/MDM.2006.143.*

Efficient forwarding of symbolically addressed geocast messages, Durr, F.; Becker, C.; Rothermel, K.; Computer Communications and Networks, 2005. ICCCN 2005. Proceedings. 14th International Conference on, Oct. 17-19, 2005 pp. 77-83, Digital Object Identifier 10.1109/ICCCN.2005.1523812.*

A Novel Route Guidance Algorithm with Maximum Coverage and Minimum Handover for Vehicular Networks; Ghedira, M.C.; Ben-Ameur, W.; Afifi, H.; Networking, 2008. ICN 2008. Seventh International Conference on; Apr. 13-18, 2008 pp. 692-697 Digital Object Identifier 10.1109/ICN.2008.31.*

Traffic forecasting and navigation assistance system via web application; Meemongkol, A.; Numsomran, A.; Tipsuwannaporn, V.; Boonsrimuang, P.; Control, Automation and Systems, 2007. ICCAS '07. International Conference on; Oct. 17-20, 2007 pp. 857-860; Digital Object Identifier 10.1109/ICCAS.2007.4407021.*

Intelligent Control Of Cellular Network Coverage Using Semi-Smart Antennas For Load Balancing; Jiayi Wu; Bigham, J.; Peng Jiang; Yapeng Wang; Signal Processing, Communications and Networking, 2008. ICSCN '08. International Conference on Jan. 4-6, 2008 pp. 295-301; Digital Object Identifier 10.1109/ICSCN.2008.4447207.*

GPSenseCar -A Collision Avoidance Support System Using Real-Time GPS Data in a Mobile Vehicular Network; Yin-Jun Chen; Ching-Chung Chen; Shou-Nian Wang; Han-En Lin; Hsu, R.C.; Systems and Networks Communications, 2006. ICSNC '06. International Conference on; Oct. 2006 pp. 71-71; Digital Object Identifier 10.1109/ICSNC.2006.41.*

SBRM: Score-Based Routing Mechanisam for vehicle ad hoc network; Ghedira, Mohame Chedly; Al Sukkar, Ghazi; Afifi, Hossam; Mobile Ad Hoc and Sensor Systems, 2008. MASS 2008. 5th IEEE International Conference on; Sep. 29, 2008-Oct. 2, 2008 pp. 718-723; Digital Object Identifier 10.1109/MAHSS.2008.4660112.*

* cited by examiner

METHOD AND SYSTEM FOR PROGRAMMABLE MOBILE VEHICLE HOTSPOTS

FIELD OF THE INVENTION

This invention relates generally to wireless communications. More specifically, the invention relates to a method and system for providing programmable mobile vehicle hotspots.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts, such as, for example Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Recently, additions have included the ability to provide positioning information and extra entertainment via the use of satellite reception capabilities.

Cellular transceivers operate within communication systems such as, for example, a telematics unit within a mobile vehicle operating within a mobile vehicle communication system (MVCS). Cellular transceivers operating within communication systems can receive large amounts of electromagnetic traffic including, but not limited to, wireless communications, GPS signals, satellite signals, and the like. Unfortunately, while telematics units within mobile vehicles are beneficial to the user, there is a need to organize and present important information to the user in a timely manner.

The present invention advances the state of the art in cellular transceivers.

SUMMARY OF THE INVENTION

One aspect of the invention includes a method of operating a telematics device within a mobile vehicle communication system. The method includes generating at least one personal route profile, comparing predetermined GPS hotspots to the personal route profiles, detecting real-time traffic updates associated with the predetermined GPS hotspots, identifying GPS hotspots corresponding to the personal route profile and based on the real-time traffic updates, and providing information relating to selected identified GPS hotspots based on the real-time traffic updates.

In accordance with another aspect of the invention, a computer readable medium storing a computer program includes: computer readable code for generating at least one personal route profile; computer readable code for comparing predetermined GPS hotspots to the personal route profiles; computer readable code for detecting real-time traffic updates associated with the predetermined GPS hotspots; computer readable code for identifying GPS hotspots corresponding to the personal route profile and based on the real-time traffic updates; and computer readable code for providing information relating to selected identified GPS hotspots based on the real-time traffic updates.

In accordance with yet another aspect of the invention, a system for providing information relating to selected GPS hotspots to a telematics device within a mobile vehicle communication system is provided. The system includes means for generating at least one personal route profile. Means for comparing predetermined GPS hotspots to the personal route profiles and means for detecting real-time traffic updates associated with the predetermined GPS hotspots are provided. Means for identifying GPS hotspots corresponding to the personal route profile and based on the real-time traffic updates and means for providing information relating to selected identified GPS hotspots based on the real-time traffic updates are also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
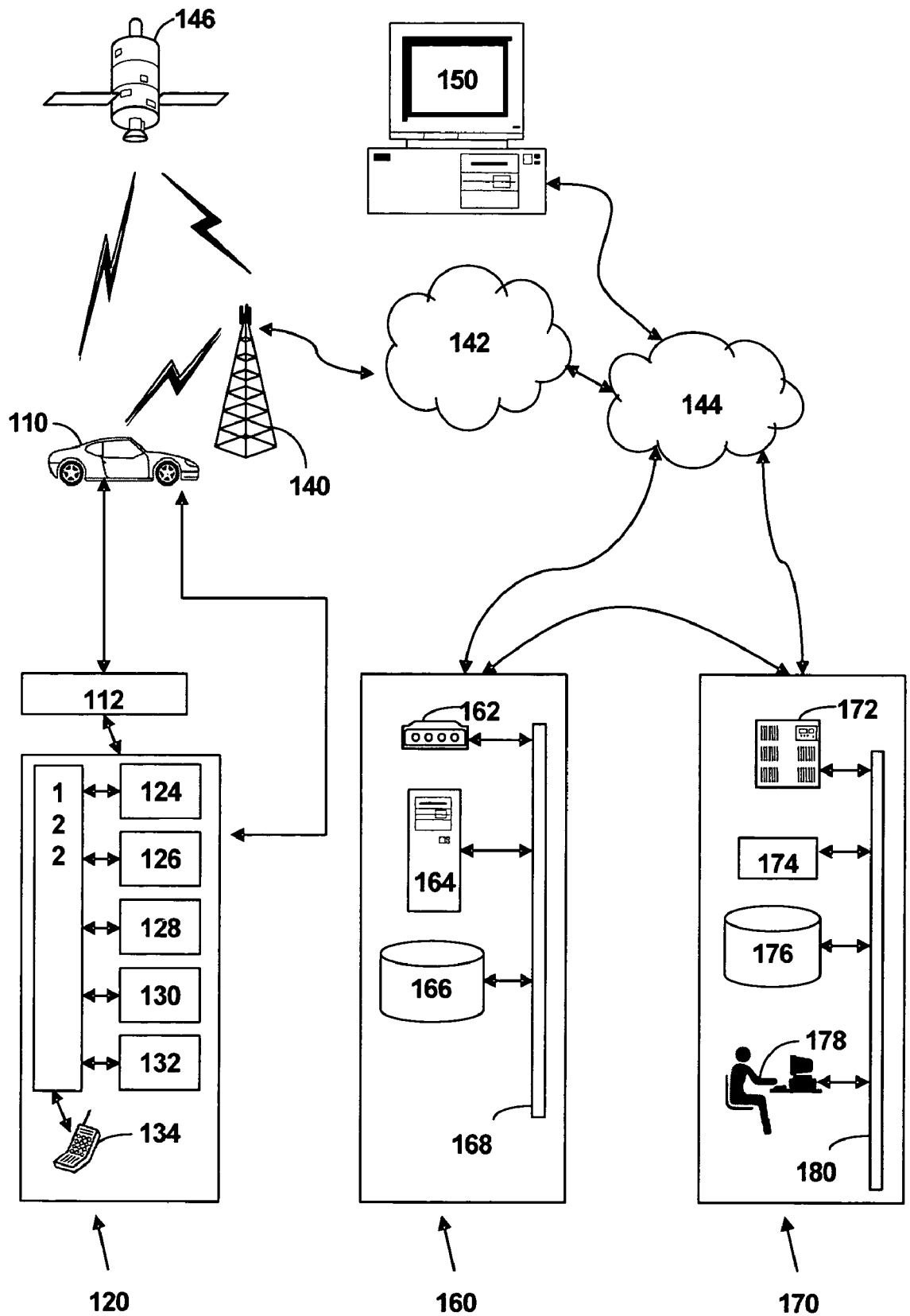
FIG. 1 illustrates an operating environment for implementing wireless communication within a mobile vehicle communication system.

FIG. 1 illustrates one embodiment of a system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, data packets, such as, for example real-time traffic updates (described below) received by telematics unit 120 are implemented by processor 122. In this example, real-time traffic updates received by telematics unit 120 are provided to a user based on predetermined criteria.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In another embodiment, the data includes directives to generate a personal route profile (described below) for use within MVCU 110.

In operation, a client utilizes computer 150 to initiate setting or re-setting of user preferences for MVCU 110. In on embodiment, a client utilizes computer 150 to provide radio station presets as user preferences for MVCU 110. In an example, user-preference data from client-side software is transmitted to server-side software of web-hosting portal 160. In this example, user-preference data is stored at web-hosting portal 160. In another embodiment, a client utilizes computer 150 to provide a personal route profile as user preferences for MVCU 110. In an example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, communications assistance, and real-time traffic updates. Communication services manager 174 receives service-preference requests for a variety of services from the client via computer 150, web-hosting portal 160, and land network 144. Communication services manager 174 transmits user-preference and other data such as, for example real-time traffic updates, primary diagnostic script, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic updates, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
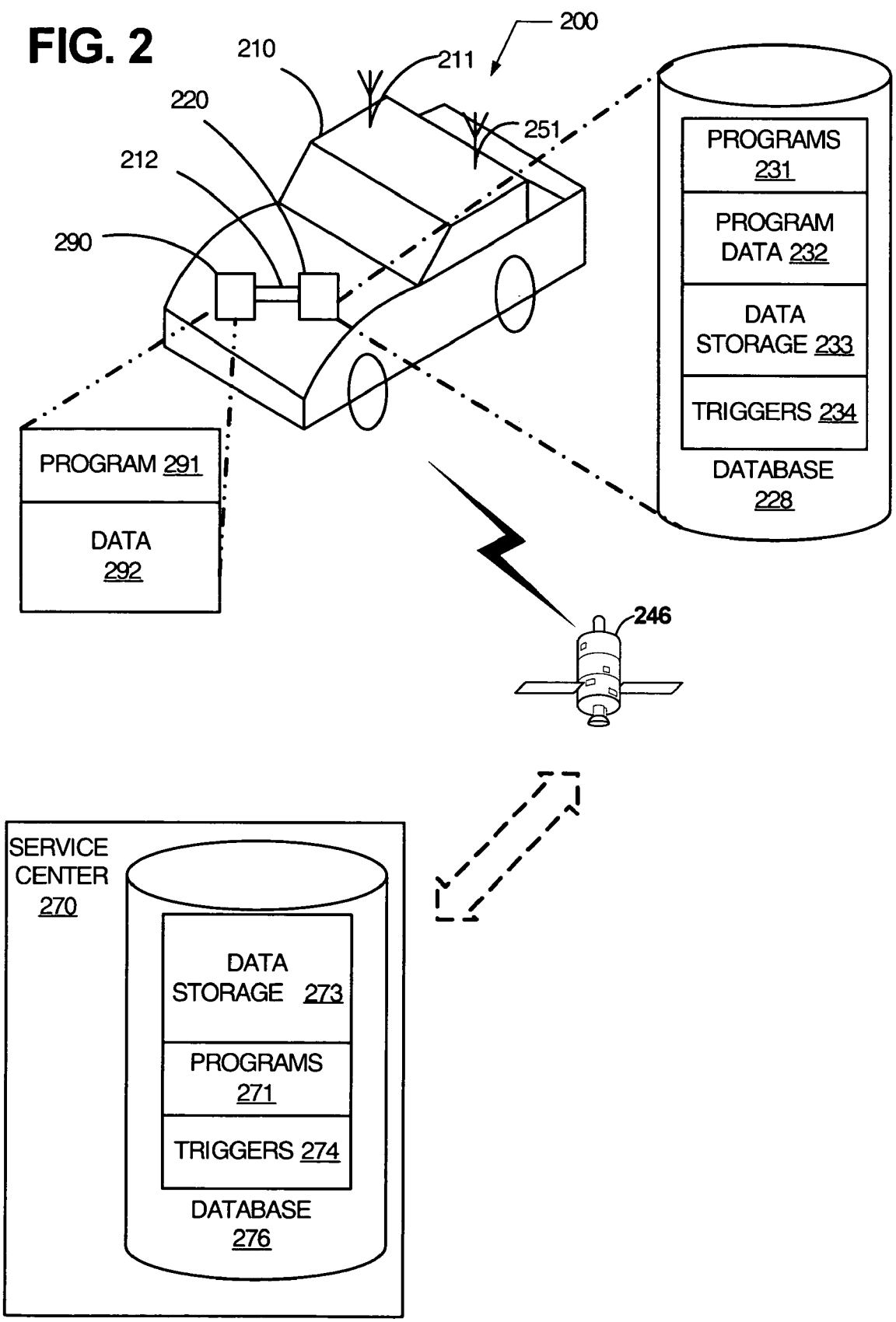
FIG. 2 is a block diagram of a telematics based system in accordance with an embodiment of the present invention.

FIG. 2 is a block diagram of a telematics based system in accordance with an embodiment of the present invention. FIG. 2 shows a telematics based system 200 for operating a vehicle telematics device as a satellite signal receiver.

In FIG. 2, the system includes a primary mobile vehicle 210, satellite broadcast system 246, and a service provider 270 such as, for example, a call center, a service center, and the like. Primary mobile vehicle 210 includes a telematics unit 220 coupled to one or more vehicle system modules 290 via a vehicle communication network 212. Primary mobile vehicle 210 additionally includes a primary antenna 211 and a satellite antenna 251. Primary antenna 211 is coupled (not shown) to telematics unit 220 to communicate with a wireless carrier system. Satellite antenna 251 is coupled (not shown) to telematics unit 220 to receive communications from satellite broadcast system 246. In another embodiment, a single antenna, such as, for example primary antenna 211 performs the functions of primary antenna 211 and a satellite antenna 251 as described above.

Telematics unit 220 further includes a database 228 that contains programs 231, program data 232, data storage 233 and triggers 234. A vehicle system module (VSM) 290 is included within primary mobile vehicle 210 and further includes a program 291 and data 292. In one embodiment, VSM 290 within primary mobile vehicle 210 is located within telematics unit 220. Service provider 270 further includes a database 276 that contains programs 271, data storage 273, and triggers 274. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with service provider 270 (e.g., a "service center"). Telematics unit 220 includes volatile and non-volatile memory components for storing data and programs. In one embodiment, memory components in telematics unit 220 contain database 228.

Database 228 includes one or more programs 231 for operating telematics unit 220, for example, for operating a vehicle telematics device as a satellite signal receiver. In operation, program 231 receives instructions and data in the form of a data stream from service provider 270 or commands from a user interface (not shown) at data storage 233. Program 231 executes the instructions such as, for example, by parsing the data stream/user interface instructions for additional instructions as well as data and triggers. In one embodiment, program 231 parses the data stream/user interface instructions and stores triggers at triggers 234. In this embodiment, program 231 transfers data to and receives data from VSM 290 for execution. In an example, program 231 parses the data stream/user interface instructions including a generated personal route profile (described below).

Vehicle system module (VSM) 290 is any vehicle system control module having software and hardware components for operating, controlling. or monitoring one or more vehicle systems. In one embodiment, VSM 290 is a satellite radio receiver and provides real-time traffic updates (described below) received from satellite broadcast system 246. In another embodiment, VSM 290 is a sensor and provides diagnostic data collected from primary mobile vehicle 210. In yet another embodiment, VSM 290 is a global positioning system (GPS) module such as, for example, GPS unit 126 of FIG. 1, and provides location information to complement diagnostic data collected from primary mobile vehicle 210 as well as user interface instructions received from a user interface.

Vehicle system module 290 contains one or more processors, one or more memory devices, and one or more connection ports. In one embodiment, VSM 290 includes a software switch for scanning received information such as, for example, real-time traffic updates and location information to identify that data has been received. VSM 290 is coupled to a vehicle communication network 212, and therefore to any other device that is also coupled to vehicle communication network 212.

In one embodiment, VSM 290 is directly coupled to telematics unit 220 in primary mobile vehicle 210, for example, vehicle communication network 212 coupling telematics unit 220 to vehicle system module 290. In an example, vehicle communication network 212 is a vehicle communication network 112 as described in FIG. 1, above. In another embodiment, VSM 290 is indirectly coupled to telematics unit 220.

Service provider 270 is any service center providing telematics services, such as service center 170 described with reference to FIG. 1. In one embodiment, service provider 270 includes hardware and software for managing database 276. In another embodiment, service center 270 is configured to access a database that is in another location but coupled to service center 270 such as, for example, database 166 in web server 160 as described in FIG. 1. Service provider 270 manages the configuring and delivery of a data stream to primary mobile vehicle 210 via wireless communications and satellite broadcasts.

Database 276 contains data stored at data storage 273 and trigger data stored at triggers 274. In one embodiment, database 276 includes one or more programs 271 for managing operation of a mobile vehicle communication system (MVCS) such as, for example, MVCS 100 in FIG. 1, above. In this embodiment, database 276 includes one or more programs 271 for managing a MVCS.

In operation, telematics unit 220 generates at least one user route profile (detailed below). Telematics unit 220 then compares the personal route profiles to predetermined GPS hotspots (described below). Real-time traffic updates associated with the predetermined GPS hotspots are then detected, such as, for example by vehicle system modules 290 implemented as a satellite radio receiver or by a satellite radio receiver within telematics unit 220. GPS hotspots corresponding to the personal route profile and based on the real-time traffic updates are then identified and information relating to the identified selected GPS hotspots based on the real-time traffic updates is provided, such as, for example to a user interface. In this way, real-time traffic updates associated with the predetermined GPS hotspots and based on personal route profiles can be provided to a user interface.

Figure 3:
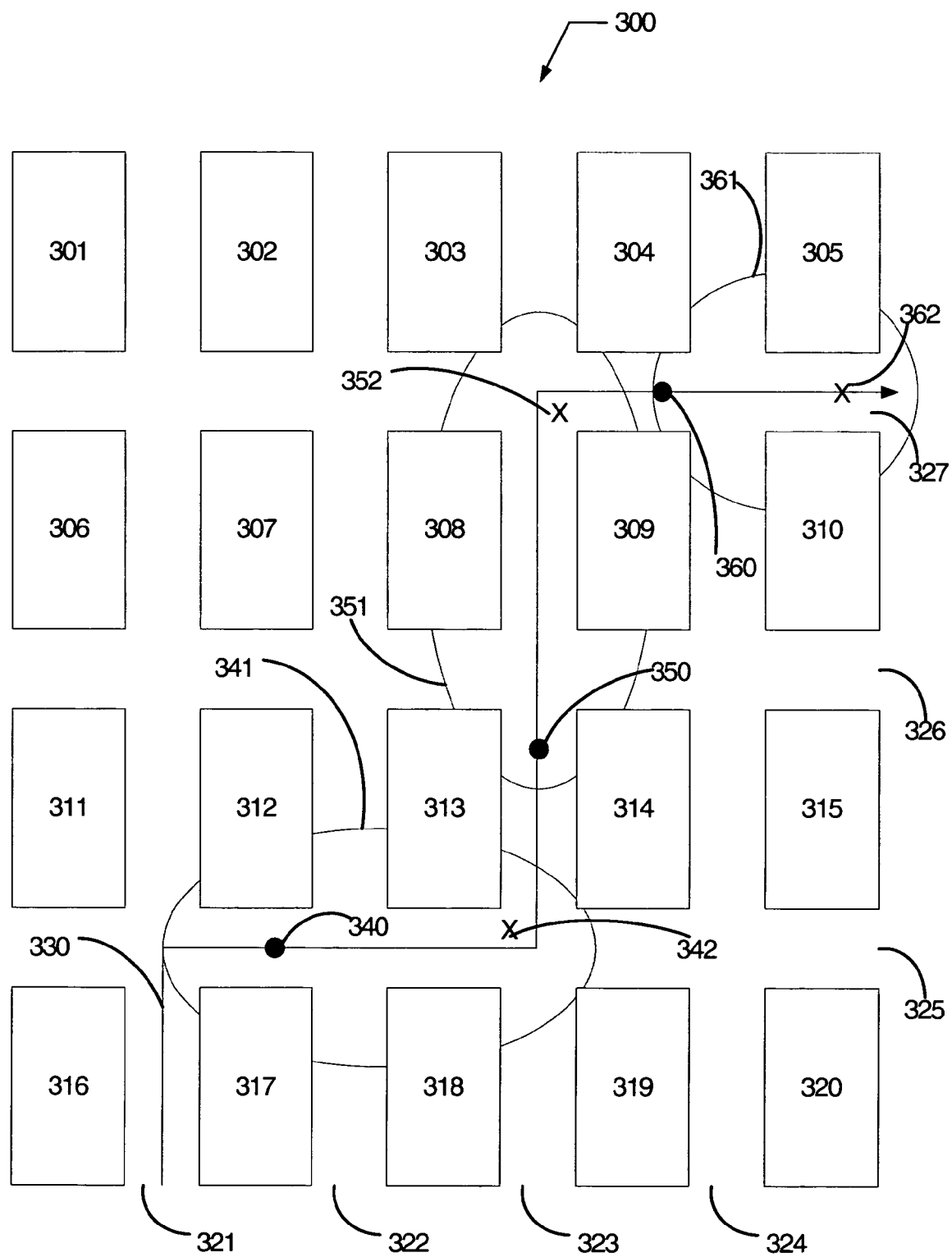
FIG. 3 illustrates an operating environment for providing programmable mobile vehicle hotspots in accordance with an embodiment of the present invention.

FIG. 3 illustrates an operating environment for providing programmable mobile vehicle hotspots in accordance with an embodiment of the present invention. FIG. 3 shows an illustrative operating environment 300 for providing programmable mobile vehicle hotspots.

In FIG. 3, the system includes geographic regions (301-320), transportation conduits (321-327), a personal route profile 330, GPS hotspots (340, 350, 360), hotspot zones (341,

351, 361), and incidents (342, 352, 362). Illustrative operating environment 300 may include additional components not relevant to the present discussion. Illustrative operating environment 300 is presented in a city block format to more easily describe the present invention. The layout of geographic regions (301-320) for explanatory purposes should not be taken as limiting the scope of the present invention.

Geographic regions (301-320) represent geographic areas of any size or dimension, such as, for example city blocks, tracts of land, and the like. Transportation conduits (321-327) are transportation paths that provide transportation routes, such as, for example a telematics equipped vehicle. In one embodiment, transportation conduits (321-327) define geographic regions (301-320).

Personal route profile 330 is user identified route profile that physically defines a geographic route from a starting point to a destination. In one embodiment, personal route profile 330 is generated based on user input from a user interface, such as, for example a telematics device user interface. In another embodiment, personal route profile 330 is generated based on GPS data associated with user driving habits.

GPS hotspots (340, 350, 360) are geographic locations along a personal route profile that identify a user's desire to determine real-time traffic information associated with a physical area proximate to a specified GPS hotspot. Hotspot zones (341, 351, 361) are the physical areas proximate to an associated specified GPS hotspot. In one embodiment, each GPS hotspot (340, 350, 360) has an associated hotspot zone (341, 351, 361). In another embodiment, each GPS hotspot (340, 350, 360) has multiple associated hotspot zones (not shown). Incidents (342, 352, 362) are geographic locations of potential interest to a user based on real-time traffic updates and a relevant personal route profile. In one embodiment, incidents (342, 352, 362) represent traffic hindrances located along a specified personal route profile at user determined geographic locations.

In operation, a telematics equipped mobile vehicle (not shown) traveling a previously generated personal route profile 330 receives satellite broadcasts including real-time traffic updates. The real-time traffic updates include traffic information defining incidents (342, 352, 362) and having GPS data embedded within the information. The telematics device compares predetermined GPS hotspots to the personal route profile 330 to identify relevant GPS hotspots (340, 350, 360). The telematics device also detects received incidents (342, 352, 362) within the real-time traffic updates that are associated with relevant GPS hotspots (340, 350, 360) and within associated hotspot zones (341, 351, 361). The traffic information based on the real-time traffic updates and relating to the identified selected GPS hotspots is then provided to the user.

In an example, incident 342 is provided to the user as incident 342 is within hotspot zone 341 that is associated with GPS hotspot 340. Further, hotspot 340 is a predetermined hotspot located between geographic regions (312 and 317) on transportation conduit 325 and within personal route profile 330. Providing incident 342 allows the user to decide whether to continue on personal route profile 330 or determine an alternative course of action, such as, for example to turn onto transportation conduit 322 from transportation conduit 325.

In another example, incident 352 is provided to the user as incident 352 is within hotspot zone 351 that is associated with GPS hotspot 350. Further, hotspot 350 is a predetermined hotspot located between geographic regions (313 and 314) on transportation conduit 323 and within personal route profile 330. Providing incident 352 allows the user to decide whether to continue on personal route profile 330 or determine an alternative course of action, such as, for example to turn onto transportation conduit 326 from transportation conduit 323.

In yet another example, incident 362 is provided to the user as incident 362 is within hotspot zone 361 that is associated with GPS hotspot 360. Further, hotspot 360 is a predetermined hotspot located between geographic regions (304 and 309) on transportation conduit 327 and within personal route profile 330. Providing incident 362 allows the user to decide whether to continue on personal route profile 330 or determine an alternative course of action, such as, for example to turn onto transportation conduit 324 from transportation conduit 327.

Figure 4:
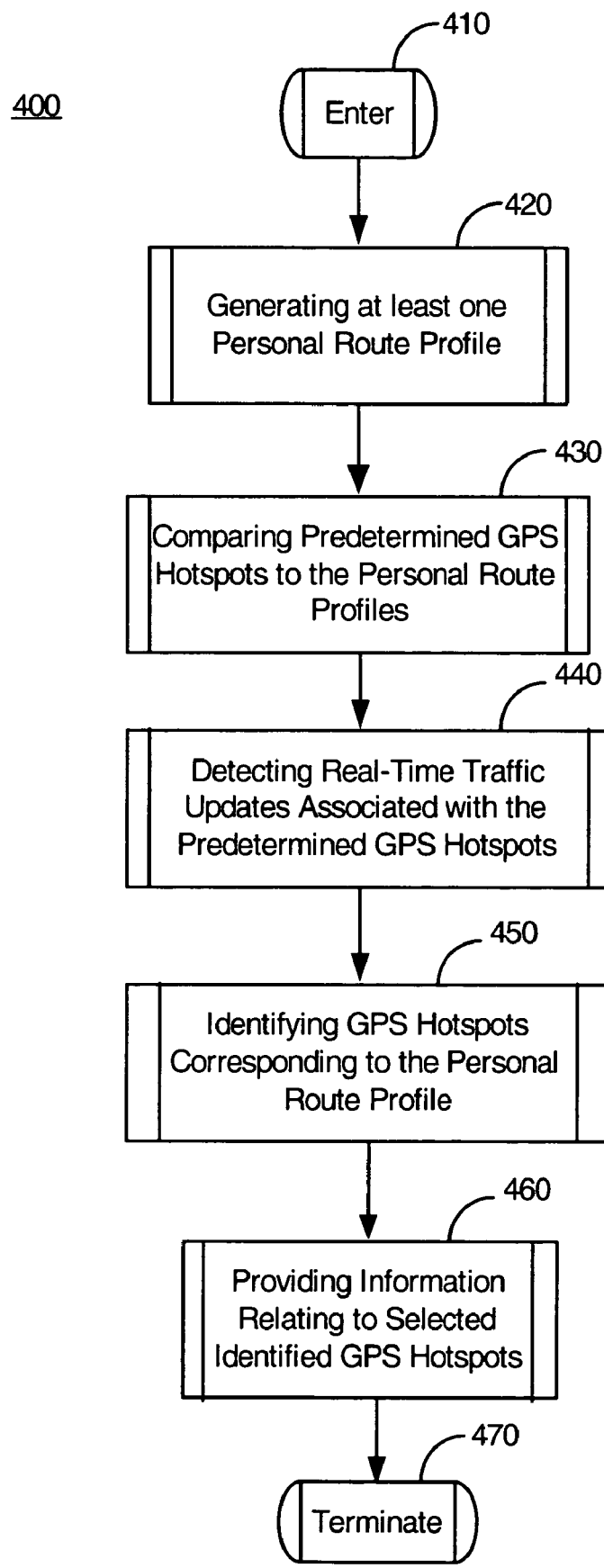
FIG. 4 is a flow diagram of one embodiment of a method of operating a vehicle telematics device to provide programmable mobile vehicle hotspots, in accordance with the present invention.

FIG. 4 is a flow diagram of one embodiment of a method of operating a vehicle telematics device to provide programmable mobile vehicle hotspots. In FIG. 4, method 400 may utilize one or more systems and concepts detailed in FIGS. 1-3, above. The present invention can also take the form of a computer usable medium including a program for configuring an electronic module within a vehicle. The program stored in the computer usable medium includes computer program code for executing the method steps described in FIG. 4. In FIG. 4, method 400 begins at step 410.

At step 420, at least one personal route profile is generated. In one embodiment, the personal route profile is generated based on user input from a user interface. In another embodiment, the personal route profile is generated in response to user behavior. For example, in embodiments wherein the personal route profile generates in response to user behavior, a learning agent, as known in the art, in communication with the GPS system monitors routes traveled by the user and determines a personal route profile is response to the routes traveled. In an example and referring to FIG. 1 above, at least one personal route profile is generated utilizing computer 150 and provided to telematics unit 120 as described. In another embodiment, generating at least one personal route profile includes monitoring GPS data associated with user driving habits and producing at least one personal route profile based on the GPS data associated with user driving habits. In yet another embodiment, generating at least one personal route profile includes monitoring input to a user interface, monitoring GPS data associated with the telematics device location at the time of the input to the user interface, and producing at least one personal route profile based input to the user interface and the GPS data associated with the input to the user interface. In an example, a user interacts with a user interface while operating a telematics equipped vehicle to generate at least one personal route profile based. In another example, a user interacts with a user interface when not operating a telematics equipped vehicle to generate at least one personal route profile based.

At step 430, predetermined GPS hotspots are compared to the personal route profiles. In one embodiment, the predetermined GPS hotspots are created based on user interface input, such as, for example when a user regularly checks real-time traffic updates. In an example and referring to FIG. 3 above, GPS hotspots (340, 350, 360) are created by a user's interaction with a user interface when utilizing personal route profile 330. In this example the user identifies GPS hotspots (340, 350, 360) utilizing the user interface. In another example, GPS hotspots (340, 350, 360) are learned by the telematics device based on user inaction with the telematics device.

At step 440, real-time traffic updates associated with the predetermined GPS hotspots are detected. In one embodiment, detecting real-time traffic updates associated with the predetermined GPS hotspots includes monitoring at least one satellite broadcast for real-time traffic updates, receiving the real-time traffic updates, and storing selected real-time traffic updates. In an example and referring to FIG. 2 above, telematics unit 220 monitors vehicle system module 290 implemented as a satellite radio receiver for real-time traffic updates. In this example, telematics unit 220 receives real-time traffic updates from satellite broadcast system 246 via vehicle system module 290. Telematics unit 220 stores the received real-time traffic updates in data storage 233 within database 228. In this example, telematics unit 220 stores all received real-time traffic updates in data storage 233 within database 228. In another example, telematics unit 220 stores relevant received real-time traffic updates in data storage 233 within database 228 based on triggering criteria, such as, for example attached GPS identifies. In this example, triggers are additionally generated and stored in triggers 234.

At step 450, GPS hotspots are identified that correspond to the personal route profile and are based on the real-time traffic updates. In an example and referring to FIG. 3 above, a telematics device detects received incidents (342, 352, 362) within the real-time traffic updates that are associated with relevant GPS hotspots (340, 350, 360) and within associated hotspot zones (341, 351, 361).

At step 460, information is provided that relates to selected identified GPS hotspots based on the real-time traffic updates. In one embodiment, selected identified GPS hotspots include all identified GPS hotspots within a predetermined geographic area of the personal route profile. In another embodiment, the selected identified GPS hotspots include GPS hotspots in the forward path of a vehicle including the telematics device.

In yet another embodiment, providing selected identified GPS hotspots includes playing the real-time traffic updates associated with the predetermined GPS hotspots at selected times. In an example, the selected time to play the real-time traffic updates associated with the predetermined GPS hotspots is immediately upon reception of the real-time traffic updates associated with the predetermined GPS hotspots. In another example, the selected time to play the real-time traffic updates associated with the predetermined GPS hotspots is user determined, such as, for example at the end of song, within a specified or default distance of the identified hotspot, prior to the opportunity to utilize an alternate route, and the like.

At step 470, the method is terminated.

The above-described methods and implementation for operating a vehicle telematics device to provide programmable mobile vehicle hotspots are example methods and implementations. These methods and implementations illustrate one possible approach for operating a vehicle telematics device to provide programmable mobile vehicle hotspots. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of operating a telematics device within a mobile vehicle communication system, comprising:
   generating at least one personal route profile;
   comparing predetermined GPS hotspots to the personal route profiles;
   detecting real-time traffic updates associated with the predetermined GPS hotspots;
   identifying GPS hotspots corresponding to the personal route profile and based on the real-time traffic updates; and
   providing information relating to selected identified GPS hotspots based on the real-time traffic updates.

2. The method of claim 1, wherein the personal route profile is generated based on user input from a user interface.

3. The method of claim 1, wherein the personal route profile is generated in response to user behavior.

4. The method of claim 1, wherein generating the at least one personal route profile comprises:
   monitoring GPS data associated with user driving habits; and
   producing at least one personal route profile based on the GPS data associated with user driving habits.

5. The method of claim 1, wherein generating the at least one personal route profile comprises:
   monitoring input to a user interface;
   monitoring GPS data associated with the telematics device location at the time of the input to the user interface; and
   producing at least one personal route profile based input to the user interface and the GPS data associated with the input to the user interface.

6. The method of claim 1, wherein detecting real-time traffic updates associated with the predetermined GPS hotspots comprises:
   monitoring at least one satellite broadcast for real-time traffic updates;
   receiving the real-time traffic updates; and
   storing selected real-time traffic updates.

7. The method of claim 1, wherein the predetermined GPS hotspots are created based on user interface input.

8. The method of claim 1, wherein the selected identified GPS hotspots include all identified GPS hotspots within a predetermined geographic area of the personal route profile.

9. The method of claim 1, wherein the selected identified GPS hotspots include GPS hotspots in the forward path of a vehicle including the telematics device.

10. The method of claim 1, wherein providing selected identified GPS hotspots includes playing the real-time traffic updates associated with the predetermined GPS hotspots at selected times.

11. A computer readable medium storing a computer program comprising:
    computer readable code for generating at least one personal route profile;
    computer readable code for comparing predetermined GPS hotspots to the personal route profiles;
    computer readable code for detecting real-time traffic updates associated with the predetermined GPS hotspots;
    computer readable code for identifying GPS hotspots corresponding to the personal route profile and based on the real-time traffic updates; and
    computer readable code for providing information relating to selected identified GPS hotspots based on the real-time traffic updates.

12. The computer readable medium of claim 11, wherein the personal route profile is generated based on user input from a user interface.

13. The computer readable medium of claim 11, wherein the computer readable code for generating the at least one personal route profile comprises:
    computer readable code for monitoring GPS data associated with user driving habits; and computer readable code for producing at least one personal route profile based on the GPS data associated with user driving habits.

14. The computer readable medium of claim 11, wherein the computer readable code for generating the at least one personal route profile comprises:
  computer readable code for monitoring input to a user interface;
  computer readable code for monitoring GPS data associated with the telematics device location at the time of the input to the user interface; and
  computer readable code for producing at least one personal route profile based input to the user interface and the GPS data associated with the input to the user interface.

15. The computer readable medium of claim 11, wherein the computer readable code for detecting real-time traffic updates associated with the predetermined GPS hotspots comprises:
  computer readable code for monitoring at least one satellite broadcast for real-time traffic updates;
  computer readable code for directing the reception of the real-time traffic updates; and
  computer readable code for storing selected real-time traffic updates.

16. The computer readable medium of claim 11, wherein the predetermined GPS hotspots are created based on user interface input.

17. The computer readable medium of claim 11, wherein the selected identified GPS hotspots include all identified GPS hotspots within a predetermined geographic area of the personal route profile.

18. The computer readable medium of claim 11, wherein the selected identified GPS hotspots include GPS hotspots in the forward path of a vehicle including the telematics device.

19. The computer readable medium of claim 11, wherein the computer readable code for providing selected identified GPS hotspots includes computer readable code for playing the real-time traffic updates associated with the predetermined GPS hotspots at selected times.

20. A system for providing information relating to selected GPS hotspots to a telematics device within a mobile vehicle communication system, comprising: means for generating at least one personal route profile means for comparing predetermined GPS hotspots to the personal route profiles; means for detecting real-time traffic updates associated with the predetermined GPS hotspots; means for identifying GPS hotspots corresponding to the personal route profile and based on the real-time traffic updates; and means for providing information relating to selected identified GPS hotspots based on the real-time traffic updates.

* * * * *